United States Patent
Balasubramanian et al.

(10) Patent No.: US 11,947,530 B2
(45) Date of Patent: Apr. 2, 2024

(54) METHODS AND SYSTEMS TO AUTOMATICALLY GENERATE SEARCH QUERIES FROM SOFTWARE DOCUMENTS TO VALIDATE SOFTWARE COMPONENT SEARCH ENGINES

(71) Applicant: Open Weaver Inc., Miami, FL (US)

(72) Inventors: Ashok Balasubramanian, Chennai (IN); Karthikeyan Krishnaswamy Raja, Chennai (IN); Arul Reagan S, Chengalpattu District (IN)

(73) Assignee: Open Weaver Inc., Miami, FL (US)

( * ) Notice: Subject to any disclaimer, the term of this patent is extended or adjusted under 35 U.S.C. 154(b) by 30 days.

(21) Appl. No.: 17/679,588

(22) Filed: Feb. 24, 2022

(65) Prior Publication Data
US 2022/0292086 A1    Sep. 15, 2022

Related U.S. Application Data

(60) Provisional application No. 63/153,225, filed on Feb. 24, 2021.

(51) Int. Cl.
G06F 16/242  (2019.01)
G06F 18/214  (2023.01)
G10L 15/22   (2006.01)

(52) U.S. Cl.
CPC .......... *G06F 16/243* (2019.01); *G06F 18/214* (2023.01); *G10L 15/22* (2013.01); *G10L 2015/223* (2013.01)

(58) Field of Classification Search
None
See application file for complete search history.

(56) References Cited

U.S. PATENT DOCUMENTS 5,953,526 A    9/1999  Day et al.
7,322,024 B2   1/2008  Carlson et al.
(Continued)

FOREIGN PATENT DOCUMENTS

CN       108052442 A       5/2018
KR    10-2020-0062917      6/2020
(Continued)

OTHER PUBLICATIONS

Lampropoulos et al., "REACT—A Process for Improving Open-Source Software Reuse", IEEE, pp. 251-254 (Year: 2018).
(Continued)

*Primary Examiner* — Eddy Cheung
(74) *Attorney, Agent, or Firm* — Foley & Lardner LLP (57) ABSTRACT

Systems and methods for automatically detecting search queries from software documents to validate component searches are provided. An example method includes receiving a number of documents, parsing a number of documents to extract a number of sentences, mapping each of the number of sentences to a number of sections, filtering the number of sentences, consolidating the number of sections and the number of filtered sentences into a summary, partitioning the summary into a first number of sentences, replacing one or more of the number of sentences with one or more paraphrase sentences generated by a machine learning model to generate a second number of sentences, and generating a number of search queries based on the second number of sentences.

20 Claims, 5 Drawing Sheets

(56) References Cited

U.S. PATENT DOCUMENTS

| | | |
|---|---|---|
| 7,703,070 B2 | 4/2010 | Bisceglia |
| 7,774,288 B2 | 8/2010 | Acharya et al. |
| 7,958,493 B2 | 6/2011 | Lindsey et al. |
| 8,010,539 B2 | 8/2011 | Blair-Goldensohn et al. |
| 8,051,332 B2 | 11/2011 | Zakonov et al. |
| 8,112,738 B2 | 2/2012 | Pohl et al. |
| 8,112,744 B2 | 2/2012 | Geisinger |
| 8,219,557 B2 | 7/2012 | Grefenstette et al. |
| 8,296,311 B2 | 10/2012 | Rapp et al. |
| 8,412,813 B2 | 4/2013 | Carlson et al. |
| 8,417,713 B1 | 4/2013 | Blair-Goldensohn et al. |
| 8,452,742 B2 | 5/2013 | Hashimoto et al. |
| 8,463,595 B1 | 6/2013 | Rehling et al. |
| 8,498,974 B1 | 7/2013 | Kim et al. |
| 8,627,270 B2 | 1/2014 | Fox et al. |
| 8,677,320 B2 | 3/2014 | Wilson et al. |
| 8,688,676 B2 | 4/2014 | Rush et al. |
| 8,838,606 B1 | 9/2014 | Cormack et al. |
| 8,838,633 B2 | 9/2014 | Dhillon et al. |
| 8,935,192 B1 | 1/2015 | Ventilla et al. |
| 8,943,039 B1 | 1/2015 | Grieselhuber et al. |
| 9,015,730 B1 | 4/2015 | Allen et al. |
| 9,043,753 B2 | 5/2015 | Fox et al. |
| 9,047,283 B1* | 6/2015 | Zhang ............... G06F 16/3346 |
| 9,135,665 B2 | 9/2015 | England et al. |
| 9,176,729 B2 | 11/2015 | Mockus et al. |
| 9,201,931 B2 | 12/2015 | Lightner et al. |
| 9,268,805 B2 | 2/2016 | Crossley et al. |
| 9,330,174 B1 | 5/2016 | Zhang |
| 9,361,294 B2 | 6/2016 | Smith |
| 9,390,268 B1 | 7/2016 | Martini et al. |
| 9,471,559 B2 | 10/2016 | Castelli et al. |
| 9,558,098 B1 | 1/2017 | Alshayeb et al. |
| 9,589,250 B2 | 3/2017 | Palanisamy et al. |
| 9,626,164 B1 | 4/2017 | Fuchs |
| 9,672,554 B2 | 6/2017 | Dumon et al. |
| 9,977,656 B1 | 5/2018 | Mannopantar et al. |
| 10,484,429 B1 | 11/2019 | Fawcett et al. |
| 10,761,839 B1 | 9/2020 | Migoya et al. |
| 10,922,740 B2 | 2/2021 | Gupta et al. |
| 11,288,167 B2 | 3/2022 | Vaughan |
| 11,294,984 B2 | 4/2022 | Kittur et al. |
| 11,295,375 B1 | 4/2022 | Chitrapura et al. |
| 11,334,351 B1 | 5/2022 | Pandurangarao et al. |
| 11,461,093 B2 | 10/2022 | Edminster et al. |
| 11,474,817 B2 | 10/2022 | Sousa et al. |
| 11,893,117 | 2/2024 | Segal et al. |
| 2001/0054054 A1 | 12/2001 | Olson |
| 2002/0059204 A1 | 5/2002 | Harris |
| 2002/0150966 A1 | 10/2002 | Muraca |
| 2002/0194578 A1 | 12/2002 | Irie et al. |
| 2004/0243568 A1 | 12/2004 | Wang et al. |
| 2006/0090077 A1 | 4/2006 | Little et al. |
| 2006/0200741 A1 | 9/2006 | Demesa et al. |
| 2006/0265232 A1 | 11/2006 | Katariya et al. |
| 2007/0050343 A1* | 3/2007 | Siddaramappa ........ G06F 16/80 |
| 2007/0185860 A1 | 8/2007 | Lissack |
| 2007/0234291 A1 | 10/2007 | Ronen et al. |
| 2007/0299825 A1 | 12/2007 | Rush et al. |
| 2009/0043612 A1 | 2/2009 | Szela et al. |
| 2009/0319342 A1 | 12/2009 | Shilman et al. |
| 2010/0106705 A1 | 4/2010 | Rush et al. |
| 2010/0121857 A1 | 5/2010 | Elmore et al. |
| 2010/0174670 A1 | 7/2010 | Malik et al. |
| 2010/0205198 A1 | 8/2010 | Mishne et al. |
| 2010/0205663 A1 | 8/2010 | Ward et al. |
| 2010/0262454 A1 | 10/2010 | Sommer et al. |
| 2011/0231817 A1 | 9/2011 | Hadar et al. |
| 2012/0143879 A1* | 6/2012 | Stoitsev ............ G06F 16/24575 707/E17.099 |
| 2012/0259882 A1 | 10/2012 | Thakur et al. |
| 2012/0278064 A1 | 11/2012 | Leary et al. |
| 2013/0103662 A1* | 4/2013 | Epstein ............... G06F 16/3329 707/706 |
| 2013/0117254 A1 | 5/2013 | Manuel-Devadoss et al. |
| 2013/0326469 A1 | 12/2013 | Fox et al. |
| 2014/0040238 A1* | 2/2014 | Scott ..................... G06F 16/332 707/769 |
| 2014/0075414 A1* | 3/2014 | Fox ........................... G06F 8/71 717/121 |
| 2014/0122182 A1 | 5/2014 | Cherusseri et al. |
| 2014/0163959 A1 | 6/2014 | Hebert et al. |
| 2014/0188746 A1 | 7/2014 | Li |
| 2014/0297476 A1 | 10/2014 | Wang et al. |
| 2014/0331200 A1 | 11/2014 | Wadhwani et al. |
| 2014/0337355 A1* | 11/2014 | Heinze .................. G06F 16/313 707/742 |
| 2015/0127567 A1 | 5/2015 | Menon et al. |
| 2015/0220608 A1 | 8/2015 | Crestani Campos et al. |
| 2015/0331866 A1 | 11/2015 | Shen et al. |
| 2016/0253688 A1 | 9/2016 | Nielsen et al. |
| 2016/0350105 A1 | 12/2016 | Kumar et al. |
| 2016/0378618 A1 | 12/2016 | Cmielowski et al. |
| 2017/0034023 A1 | 2/2017 | Nickolov et al. |
| 2017/0063776 A1 | 3/2017 | Nigul |
| 2017/0154543 A1 | 6/2017 | King et al. |
| 2017/0220633 A1 | 8/2017 | Porath et al. |
| 2017/0286541 A1 | 10/2017 | Mosley et al. |
| 2017/0286548 A1 | 10/2017 | De et al. |
| 2018/0046609 A1 | 2/2018 | Agarwal et al. |
| 2018/0067836 A1 | 3/2018 | Apkon et al. |
| 2018/0114000 A1 | 4/2018 | Taylor |
| 2018/0329883 A1* | 11/2018 | Leidner .................. G06F 40/30 |
| 2018/0349388 A1 | 12/2018 | Skiles et al. |
| 2019/0278933 A1 | 9/2019 | Bendory et al. |
| 2019/0286683 A1 | 9/2019 | Kittur et al. |
| 2019/0311044 A1 | 10/2019 | Xu et al. |
| 2019/0324981 A1 | 10/2019 | Counts et al. |
| 2020/0110839 A1* | 4/2020 | Wang ................... G06F 16/335 |
| 2020/0125482 A1 | 4/2020 | Smith et al. |
| 2020/0133830 A1 | 4/2020 | Sharma et al. |
| 2020/0293354 A1 | 9/2020 | Song et al. |
| 2020/0301672 A1 | 9/2020 | Li et al. |
| 2020/0301908 A1 | 9/2020 | Frost et al. |
| 2020/0348929 A1 | 11/2020 | Sousa et al. |
| 2020/0356363 A1 | 11/2020 | Dewitt et al. |
| 2021/0049091 A1 | 2/2021 | Hikawa et al. |
| 2021/0141863 A1* | 5/2021 | Wu .......................... G06N 3/08 |
| 2021/0149658 A1 | 5/2021 | Cannon et al. |
| 2021/0149668 A1 | 5/2021 | Gupta et al. |
| 2021/0349801 A1 | 11/2021 | Rafey |
| 2021/0357210 A1 | 11/2021 | Clement et al. |
| 2021/0382712 A1 | 12/2021 | Richman et al. |
| 2021/0397418 A1 | 12/2021 | Nikumb et al. |
| 2022/0012297 A1 | 1/2022 | Basu et al. |
| 2022/0083577 A1 | 3/2022 | Yoshida et al. |
| 2022/0215068 A1 | 7/2022 | Kittur et al. |
| 2023/0308700 A1 | 9/2023 | Perez |

FOREIGN PATENT DOCUMENTS

| | | | |
|---|---|---|---|
| WO | WO-2007/013418 A1 | 2/2007 | |
| WO | WO-2020/086773 A1 | 4/2020 | |

OTHER PUBLICATIONS

Leclair et al., "A Neural Model for Generating Natural Language Summaries of Program Subroutines," Collin McMillan, Dept. of Computer Science and Engineering, University of Notre Dame Notre Dame, IN, USA, Feb. 5, 2019.

Schweik et al., Proceedings of the OSS 2011 Doctoral Consortium, Oct. 5, 2011, Salvador, Brazil, pp. 1-100, Http:/Avorks.bepress.com/charles_schweik/20 (Year: 2011).

Stanciulescu et al., "Forked and Integrated Variants in an Open-Source Firmware Project", IEEE, pp. 151-160 (Year: 2015).

Zaimi et al., ":An Empirical Study on the Reuse of Third-Party Libraries in Open-Source Software Development", ACM, pp. 1-8 (Year: 2015).

Iderli Souza, An Analysis of Automated Code Inspection Tools for PHP Available on Github Marketplace, Sep. 2021, pp. 10-17 (Year: 2021).

(56) References Cited

OTHER PUBLICATIONS

Khatri et al., "Validation of Patient Headache Care Education System (PHCES) Using a Software Reuse Reference Model", Journal of System Architecture, pp. 157-162 (Year: 2001).

Lotter et al., "Code Reuse in Stack Overflow and Popular Open Source Java Projects", IEEE, pp. 141-150 (Year: 2018).

Rothenberger et al., "Strategies for Software Reuse: A Principal Component Analysis of Reuse Practices", IEEE, pp. 825-837 (Year:2003).

Tung et al., "A Framework of Code Reuse in Open Source Software", ACM, pp. 1-6 (Year: 2014).

Andreas DAutovic, "Automatic Assessment of Software Documentation Quality", published by IEEE, ASE 2011, Lawrence, KS, USA, pp. 665-669, (Year: 2011).

M. Squire, "Should We Move to Stack Overflow?" Measuring the Utility of Social Media for Developer Support, 2015 IEEE/ACM 37th IEEE International Conference on Software Engineering, Florence, Italy, 2015, pp. 219-228, doi: 10.1109/ICSE.2015.150. (Year: 2015).

S. Bayati, D. Parson, T. Sujsnjak and M. Heidary, "Big data analytics on large-scale socio-technical software engineering archives," 2015 3rd International Conference on Information and Communication Technology (IColCT), Nusa Dua, Bali, Indonesia, 2015, pp. 65-69, doi: 10.1109/IColCT.2015.7231398. (Year: 2015).

\* cited by examiner

METHODS AND SYSTEMS TO AUTOMATICALLY GENERATE SEARCH QUERIES FROM SOFTWARE DOCUMENTS TO VALIDATE SOFTWARE COMPONENT SEARCH ENGINES

CROSS-REFERENCE TO RELATED PATENT APPLICATION

This application claims the benefit of and priority to U.S. Provisional Patent Application No. 63/153,225 filed Feb. 24, 2021, the entire disclosure of which is incorporated by reference herein.

TECHNICAL FIELD

The present disclosure relates to methods and systems for validating search engines specialized in the field of software component search.

BACKGROUND

There are over 40 million software components available in the public domain. For a developer to find a component to use from this vast collection is extremely time consuming and error prone. Hence there is a need for specialized search engines to help developers in finding the right software components to use.

Chinese Patent Application Publication Number CN 108052442 A titled "Engine testing method and terminal and computer-readable storage medium" by Liao Ming, filed on Oct. 30, 2017, discloses methods and systems for testing a search engine. Testing data required for engine testing are acquired, and M searching keywords are generated according to the testing data; at least two parallel threads are started; through utilizing each thread, a searching keyword unused for searching is selected from the M searching keywords at every turn to be used as a searching keyword of a to-be-tested searching engine, and is input into the to-be-tested searching engine for starting searching; searching of the to-be-tested searching engine on at least two searching keywords is realized at once for improving searching efficiency; and after searching ends, a searching testing result of the to-be-tested searching engine on each search keyword is acquired for obtaining data of performance evaluation on the engine. According to the method, the multiple parallel threads are used for testing, thus time required for testing is shortened, the searching keywords are automatically generated by the engine testing terminal, thus bias of man-made selection is avoided, and improvement of coverage of the testing results is facilitated.

U.S. Pat. No. 8,219,557 B2 titled "System for automatically generating queries," by Gregory T. Grefenstette and James G. Shanahan, filed on Jun. 10, 2010, discloses methods and systems for automatically generating a query from document content. The '557 patent discloses automatically formulating a query for document content by providing a first element of the query representative of at least one entity identified in the selected-document content, and by providing a second element of the query focusing the query to the subset of categories of document content assigned to the selected-document content. After formulating the query, it automatically acquires the search results by using the query for querying document content available through the information retrieval system.

However, the prior art documents and the conventional techniques existed at the time of the present disclosure do not teach any system or methods to test such a search engine for software component search. The existing technology does not disclose an automated way to test such a search engine. This results in significant manual effort in deriving the accuracy of a search engine and significant manual errors in interpreting the accuracy manually.

Therefore, there exists a need for an improved method and a system for testing a software component search engine, which will result in significant time savings in building, validating the software component specific search engine, and provides accuracy in validation.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Embodiments of the present disclosure provide systems, methods, and computer program product for automatically generating search queries from software documents to validate software component search engines. The present disclosure provides a solution to auto generate search queries from documents pertaining to software components automatically and test a search engine against those queries to validate the search accuracy. The systems and methods disclosed herein will be able to execute a very high volume of test cases and document the accuracy automatically. This will result in significant time savings in building, validating a software component specific search engine and provide accuracy in validation.

In one embodiment, a system for automatically generating search queries from software documents to validate software component search engines is provided. The system includes: at least one processor that operates under control of a stored program including a sequence of program instructions to control one or more components, wherein the components including: a Web GUI portal for a user or an external system to submit a set of documents to request search query generation and view results; a Description Readme and Code Parser that parses the submitted documents; a Tokenize and Preprocessing Engine that processes the sentences extracted from the documents; a Query Generator that anchors the query generation process; a Summarizer Service to summarize the tokenized and preprocessed sentences; a Splitter and Resizer Service to split the set of summarized sentences; a Paraphraser Service to generate alternate sentences; a Sentence Corpus Machine Learning Service to build a taxonomy.

In another embodiment, a method for automatically generating search queries from software documents to validate software component search engines is provided. The method includes: providing at least one processor that operates under control of a stored program including a sequence of program instructions including: submitting a set of documents to request search query generation and view results; parsing the submitted documents to remove image, hyperlinks, and similar noise; extracting content from tables; extracting license and credit information; extracting and parse code and commands using machine learning algorithm; classifying if the content is software related using machine learning algorithm; processing the qualified content from extraction; anchoring the query generation process; summarizing the preprocessed sentences; splitting the set of summarized sentences; generating alternate sentences;

detecting phrases using transformers and custom machine learning techniques; building a taxonomy; extracting multiple queries based on detected phrases; and building search queries to validate the software component search engine.

In yet another embodiment, a computer program product for automatically generating search queries from software documents to validate software component search engines is provided. The computer program product includes: a processor and memory storing instructions thereon, wherein the instructions when executed by the processor causes the processor to: submit a set of documents to request search query generation and view results; parse the documents submitted to remove image, hyperlinks and similar noise; extract content from tables; extract license and credit information; extract and parse code and commands using machine learning algorithm; classify if the content is software related using machine learning algorithm; process the qualified content from extraction; anchor the query generation process; summarize the preprocessed sentences; split the set of summarized sentences; generate alternate sentences; detect phrases using transformers and custom machine learning techniques; build a taxonomy; extract multiple queries based on detected phrases; and build search queries to validate the software component search engine.

One implementation of the present disclosure is a system to automatically generate search queries from software documents. The system includes one or more processors and memory storing instructions that, when executed by the one or more processors, cause the one or more processors to perform operations. The operations include receiving a number of documents, parsing a number of documents to extract a number of sentences, mapping each of the number of sentences to a number of sections, filtering the number of sentences, consolidating the number of sections and the number of filtered sentences into a summary, partitioning the summary into a first number of sentences, replacing one or more of the number of sentences with one or more paraphrase sentences generated by a machine learning model to generate a second number of sentences, and generating a number of search queries based on the second number of sentences.

In some embodiments, parsing the number of documents to extract a number of sentences includes converting a number of programming code snippets to a number of text snippets.

In some embodiments, filtering the number of sentences includes removing stop words, duplicate sentences, and natural language sentences that are not associated with software components.

In some embodiments, the machine learning model is trained with training data including a number of software dictionaries, hierarchies, synonyms, sentence variations, and summary representations.

In some embodiments, generating the number of search queries based on the second number of sentences includes the machine learning model using at least on of part of speech tagging, named entity recognition, computing character combination, word length detection, and inverse document frequency scoring.

In some embodiments, the operations further include providing a user with a comparison of between the number of search queries and the number of sentences.

In some embodiments, the machine learning model is trained with training data including meta-data retrieved form license and credit information associated with the number of documents.

Another implementation of the present disclosure is a method for automatically generate search queries from software documents. The method includes, receiving a number of documents, parsing a number of documents to extract a number of sentences, mapping each of the number of sentences to a number of sections, filtering the number of sentences, consolidating the number of sections and the number of filtered sentences into a summary, partitioning the summary into a first number of sentences, replacing one or more of the number of sentences with one or more paraphrase sentences generated by a machine learning model to generate a second number of sentences, and generating a number of search queries based on the second number of sentences.

In some embodiments, the method includes providing a user with a comparison of between the number of search queries and the number of sentences.

Another implementation of the present disclosure is one or more non-transitory computer-readable media for automatically generating search queries from software documents. The computer-readable media stores instructions thereon. The instructions, when executed by one or more processors, cause the one or more processors to receive a number of documents, parse the number of documents to extract a number of sentences, map each of the number of sentences to a number of sections, filter the number of sentences, consolidate the number of sections and the number of filtered sentences into a summary, partition the summary into a first number of sentences, replace one or more of the number of sentences with one or more paraphrase sentences generated by a machine learning model to generate a second number of sentences, and generate a number of search queries based on the second number of sentences.

In some embodiments, the instructions cause the one or more processors to provide a user with a comparison of between the number of search queries and the number of sentences.

Details of one or more implementations of the subject matter described in this specification are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Various aspects of the systems and methods are described more fully hereinafter with reference to the accompanying drawings. The teachings disclosed may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the systems, apparatuses, and methods disclosed herein, whether implemented independently or combined with any other aspect of the disclosure. In addition, the scope is intended to cover such a system or method which is practiced using other structure and functionality as set forth herein. It should be understood that any aspect disclosed herein may be embodied by one or more elements of a claim.

Figure 1:
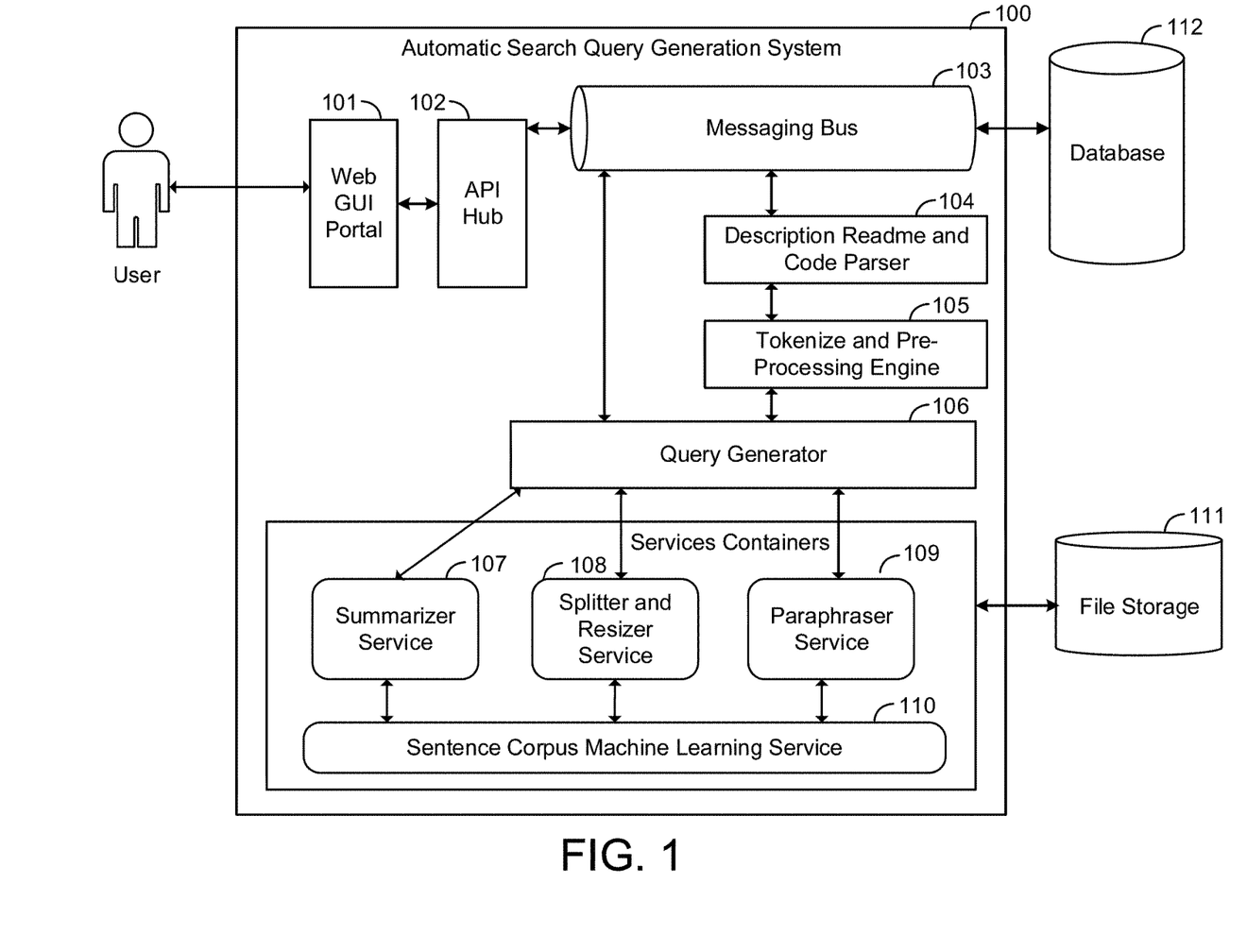
FIG. 1 shows a system architecture that automatically generates search queries from software documents to validate software component search engines, according to some embodiments.

FIG. 1 shows a System 100 or a high-level architecture for automatically generating search queries from software documents to validate software component search engines. Briefly, and as described in further detail below, the System 100 discloses a Web GUI Portal 101, API Hub 102, Messaging Bus 103, Description Readme and Code Parser 104, Tokenize and Preprocessing Engine 105, Query Generator 106, Services Containers such as Summarizer Service 107, Splitter and Resizer Service 108, Paraphraser Service 109, and Sentence Corpus Machine Learning Service 110, File Storage 111, and Database 112, which are a unique set of components to perform the task of automatic generation of search queries from software documents to validate Software component search engines given the software documents.

In some embodiments, System 100 includes the Web GUI Portal 101, which has a user interface form for a user to interface with the System 100 for submitting different documents for generating search queries and viewing their status. The Web GUI Portal 101 allows the user to submit requests for submitting different documents for generating search queries and viewing the generated results. For submitting a new request, user is presented with a form to provide the documents that they would like to generate search queries against. Alternatively, where automation is required, the Web GUI Portal 101 can also interact with an external system to provide the same information that the user would have provided.

In some embodiments, the submitted request from Web GUI Portal 101 goes to the API Hub 102 which acts as a gateway for accepting and transmitting all web service requests from the portal. The API Hub 102 hosts the web services for taking the requests and creating request messages to be put into the Messaging Bus 103. The Messaging Bus 103 provides for event driven architecture, thereby enabling long running processes to be decoupled from requesting system's calls. This decoupling will help the system to service the request and notify user once the entire process of generating queries is completed. There are job listeners configured to listen to the messages in the Messaging Bus 103.

In some embodiments, the Description Readme and Code Parser 104 uses machine learning techniques to parse the documents submitted by the user and extracts all functional and code details from the documents. It differentiates sections to uniquely identify the useful sections such as but not limited to short description, long description, overview, features, user guide, code and parses the text from those sections. It processes widely used natural languages such as but not limited to English, French, German, Spanish.

In some embodiments, the Tokenize and Preprocessing Engine 105 uses machine learning techniques to process the sentences extracted by the Description Readme and Code Parser 104. It converts code to text, removes unnecessary information such as stop words, duplicate sentences, general natural language sentences that are not associated generally with software components, lemmatizes, stems and tokenizes the software component related keywords in the sentences and creates a set of tokenized and preprocessed sentences.

In some embodiments, the Query Generator 106 anchors the query generation process and calls the Summarizer Service 107, Splitter and Resizer Service 108, and Paraphraser Service 109 passing the outputs as inputs to the subsequent steps. It compares the final set of queries against the original parsed sentences and if they are dissimilar based on an internal threshold of similarity index, they are passed back to the user or the calling system. If they are not dissimilar, they are iterated through the Summarizer Service 107, Splitter and Resizer Service 108, Paraphraser Service 109 multiple times until they are dissimilar based on the internal threshold of similarity index.

In some embodiments, the Summarizer Service 107 uses machine learning techniques to summarize the tokenized and preprocessed sentences. This converts a set of discrete sentences into to homogenized summary thereby significantly altering the sentence structures present in the tokenized and preprocessed sentences creating a shorter set of summarized sentences.

In some embodiments, the Splitter and Resizer Service 108 uses machine learning techniques to split the set of summarized sentences into a set of individual sentences. It compares the individual sentences and resizes them to similar lengths to ensure the individual sentences carry similar weightages.

In some embodiments, the Paraphraser Service 109 uses machine learning techniques and natural language generation techniques to generate alternate sentences from each split and resized sentence.

In some embodiments, the Sentence Corpus Machine Learning Service 110 uses machine learning techniques to build a taxonomy of software component focused dictionaries, hierarchies, synonyms, sentence variations, summary representations that support the Summarizer Service 107, Splitter and Resizer Service 108, Paraphraser Service 109.

In some embodiments, the File Storage 111 is used to store document type of data, source code files, keywords, dictionaries, hierarchies, documents, readme files, user guides, neural network models etc.

In some embodiments, the Database 112 is a relational database management service (RDBMS) database like MySQL to store all meta-data pertaining to the requests received from the user, external system, messaging bus, request processor and from other system components described above. The meta-data includes details of every request to identify who submitted it, requested details to track the progress as the System processes the request through its different tasks. The status of each execution step in whole process is stored in this database to track and notify the system on completion.

Figure 2:
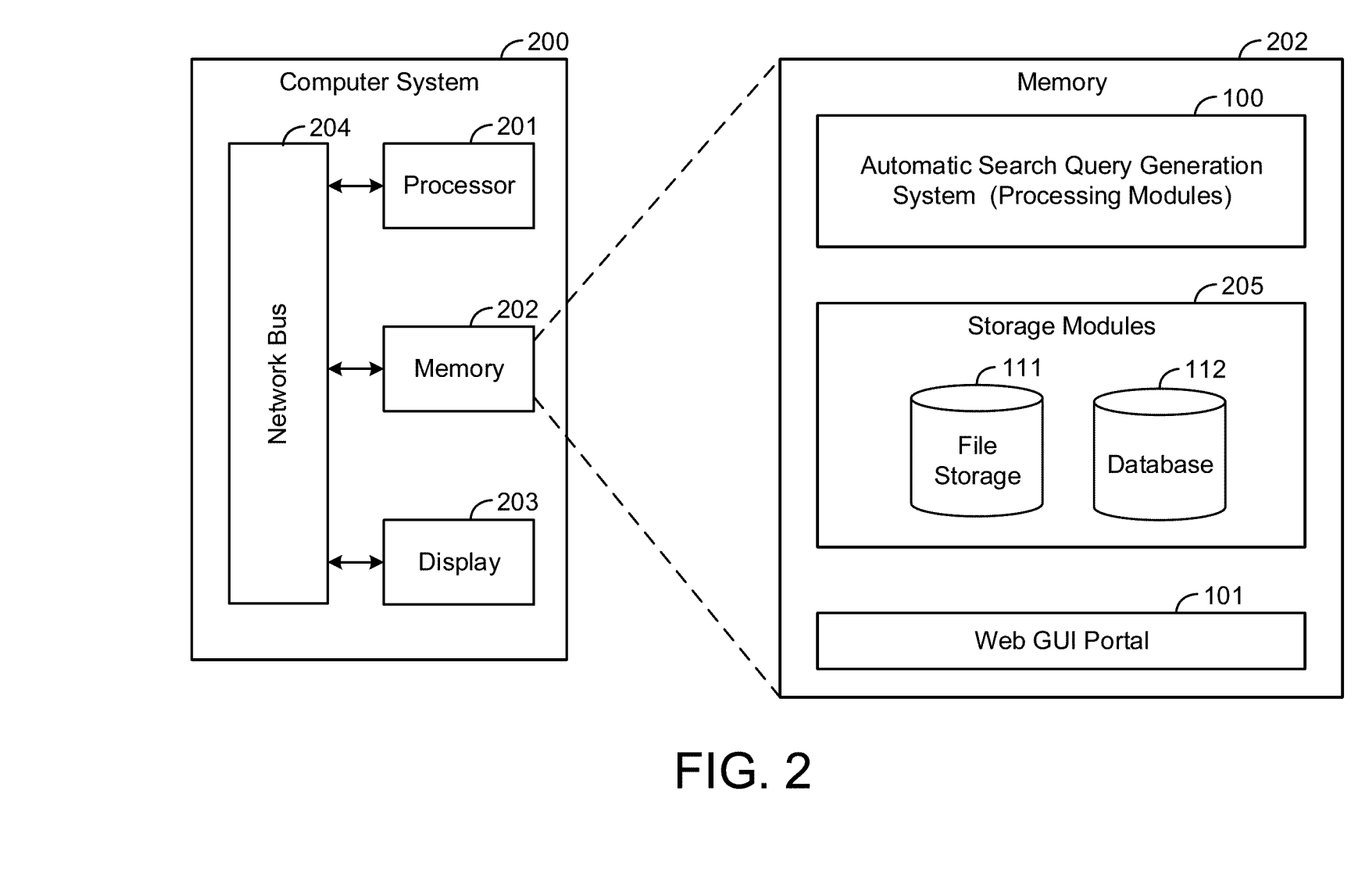
FIG. 2 shows an example computer system implementation to automatically generate search queries from software documents to validate software component search engines, according to some embodiments.

FIG. 2 shows a block view of a System 200 configured to perform automatic generation of search queries from software documents to validate software component search engines, according to some embodiments. The system 200 may include a Processor 201, Memory 202, Display 203, Network Bus 204, and other input/output like a mic, speaker, wireless card etc. The Generate Search Queries from Software Documents Modules (e.g., the System 100 of FIG. 1), File Storage 111, Database 112, and Web GUI Portal 101 are stored in the Memory 202, which provides the necessary machine instructions to the Processor 201 to perform the executions for automatically generating search queries from software documents. The Processor 201 controls the overall operation of the system and manages the communication between the components through the Network Bus 204. The Memory 202 holds the code, data, and instructions of the processing modules of the System 100 and may be of different types of the non-volatile memory and volatile memory.

Figure 3:
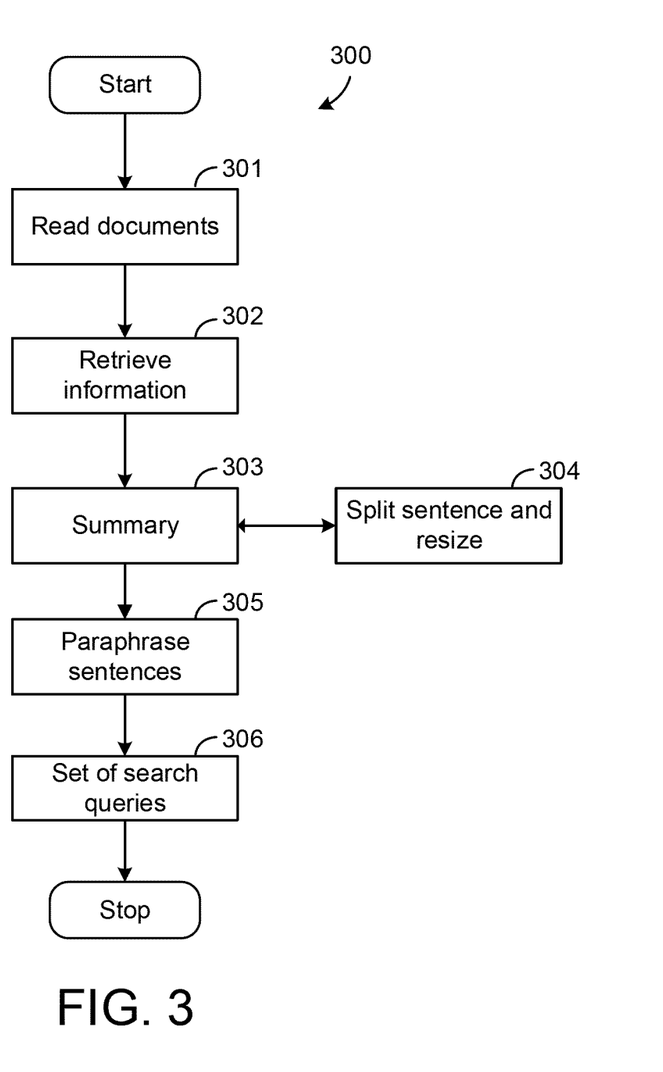
FIG. 3 shows the overall process flow of automatically generating search queries from software documents to validate software component search engines, according to some embodiments.

FIG. 3 shows an end-to-end process 300 to automatically generate search queries from software documents to validate software component search engines, according to some embodiments. In step 301, the input documents from the user are captured (e.g., read) into the System 100. In step 302, the documents are parsed to extract (e.g., retrieve) the sentences from the relevant sections of the documents. In step 303, the sentences are summarized into a cohesive paragraph or a set of paragraphs thereby transforming them from the initial sentence formations. Step 303 may further include step 304, where the summarized paragraphs are split back to individual sentences and resized for uniform lengths. In step 305, the resized individual sentences are paraphrased into similar sentences using natural language generation and a sophisticated machine learning based software taxonomy built out of a large corpus of software-related documents. In step 306, the queries are reviewed against the initial sentences and the dissimilar ones are created into a set that is transmitted back to the user or the calling system. The dissimilar queries are used to test the search engine in its accuracy to find the respective software component.

Figure 4:
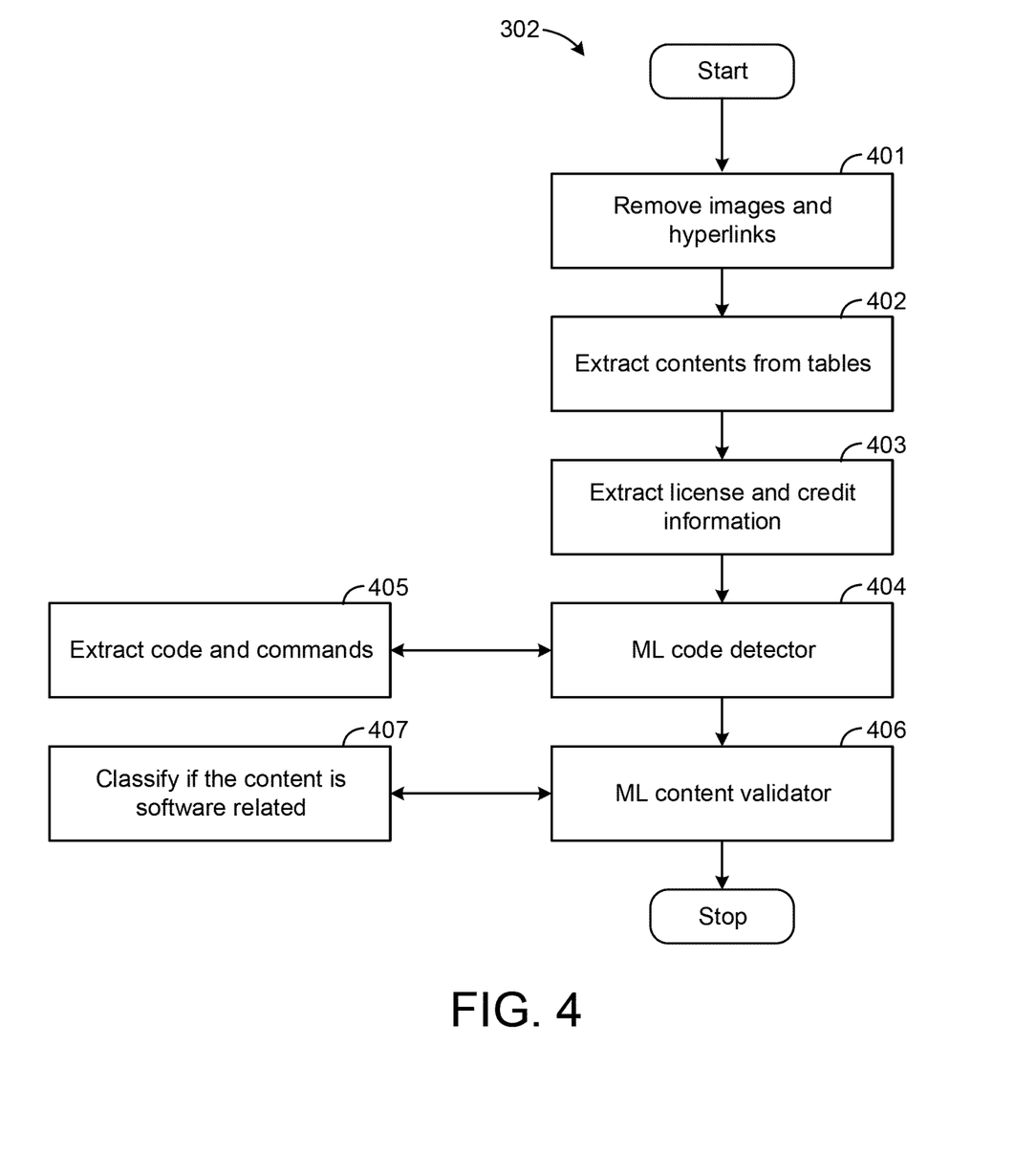
FIG. 4 shows the detailed steps of processing the received input documents, according to some embodiments.

FIG. 4 shows step 302 of process 300 in greater detail, detailing a process for parsing documents to extract sentences from relevant sections of the documents, according to some embodiments. In step 401, images, hyperlinks and similar noise are filtered. In step 402, text from table formats in documents is extracted. In step 403, meta-data related to the document including, but not limited to, license and credit information are extracted. In step 404 detects code snippets and commands are detected. Accordingly, step 404 may further include step 405. In step 405, a machine learning algorithm is used to detect and extract code snippets and commands. In step 406, the filtered and preprocessed document (e.g., the machine learning content) is validated. Step 406 may further include step 407. In step 407, the content is classified as to whether it is software-related using a machine learning algorithm. As detailed in regards to FIG. 4, a sample input of step 302 is shown below:

PyTorch is a Python package that provides two high-level features:
Tensor computation (like NumPy) with strong GPU acceleration
Deep neural networks built on a tape-based autograd system
<a href=https://pytorch.org> click here </a>

Figure 5:
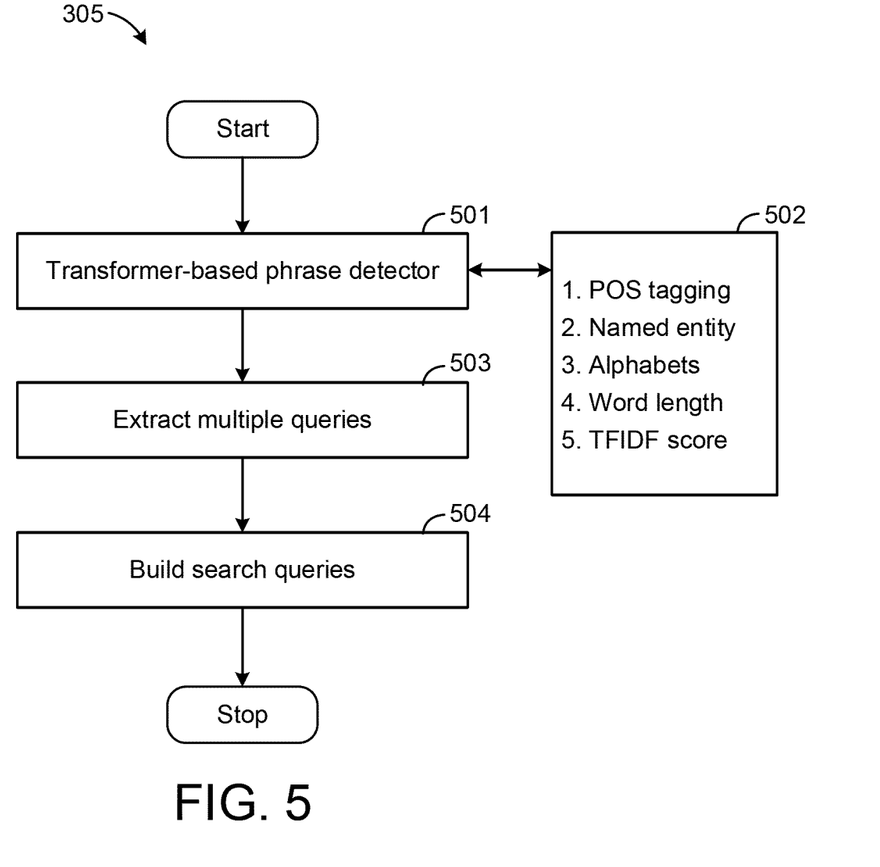
FIG. 5 shows the further processing of paraphrased sentences, according to some embodiments.

As detailed in regards to FIG. 4, a sample output of step 302 is shown below:

PyTorch is a Python package that provides two high-level features:
Tensor computation (like NumPy) with strong GPU acceleration
Deep neural networks built on a tape-based autograd system FIG. 5 shows step 305 of process 300 in greater detail, detailing a process for paraphrasing resized individual sentences into similar sentences using natural language generation and a machine learning model, according to some embodiments. In step 501, phrases are detected. Step 501 includes step 502. In step 502, techniques are applied including part of speech (POS) tagging; named entity recognition (NER); computing character combination (e.g., alphabet detection); word length detection; and Term Frequency-Inverse Document Frequency (TFIDF) scoring. The result is evaluated for the qualification of phrases. The qualified phrases are further reinforced with the help of a transformer-based custom machine learning technique. In step 503, multiple queries are extracted and framed out of the phrases detected in step 501. In step 504, the possible queries based on types such as, but not limited to keyword, syntactical and the combination of both are generated. The number of queries to be generated is internally managed by default if not specified. The generated queries are reviewed against the initial sentences and the dissimilar ones are created into a set that is transmitted back to the user or the calling system.

As detailed in regards to FIG. 5, a sample input of step 305 (e.g., input to step 501) is shown below:

PyTorch is a Python package that provides Tensor computation with strong GPU acceleration and Deep neural networks built on a tape-based autograd system.
Tensor computation with high GPU acceleration and tape-based Deep neural networks are enabled by Pytorch library in Python.
PyTorch is a Python library that offers Tensor computing with substantial GPU acceleration, as well as Deep neural networks built on a tape-based autograd system.

As detailed in regards to FIG. 5, a sample input of step 501 is shown below:

PyTorch is a Python package that provides Tensor computation with strong GPU acceleration and Deep neural networks built on a tape-based autograd system
Tensor computation with high GPU acceleration and tape-based Deep neural networks are enabled by Pytorch library in Python.
PyTorch is a Python library that offers Tensor computing with substantial GPU acceleration, as well as Deep neural networks built on a tape-based autograd system.

As detailed in regards to FIG. 5, a sample input of step 504 is shown below:

What is pytorch?
Pytorch library
What is pytorch, and what is it used for?
Python library with GPU support
Which python package has GPU support?
GPU acceleration for tensor computation in python
Deep neural networks library in python
What is the python package for deep neural networks?
Python based library for deep neural network
Which is the python package for tensor computation?
Tensor computation in python
Python library to tensor computing

What is claimed is:
1. A system to validate a search engine by automatically generating search queries from a plurality of software documents, the system comprising:
one or more processors and memory storing instructions that, when executed by the one or more processors, cause the one or more processors to perform operations comprising:
receiving the plurality of software documents;
parsing the plurality of software documents to extract a plurality of sentences;

mapping each of the plurality of sentences to a plurality of sections;
filtering the plurality of sentences;
consolidating the plurality of sections and the plurality of filtered sentences into a summary;
partitioning the summary into a first plurality of sentences;
replacing one or more of the first plurality of sentences with one or more paraphrase sentences generated by a machine learning model to generate a second plurality of sentences;
generating the search queries based on the second plurality of sentences; and
using the search queries to test whether the search engine finds the plurality of software documents.

2. The system of claim 1, wherein parsing the plurality of software documents to extract the plurality of sentences comprises converting a plurality of programming code snippets to a plurality of text snippets.

3. The system of claim 1, wherein filtering the plurality of sentences comprises removing stop words, duplicate sentences, and natural language sentences that are not associated with software components.

4. The system of claim 1, wherein the machine learning model is trained with training data comprising a plurality of software dictionaries, hierarchies, synonyms, sentence variations, and summary representations.

5. The system of claim 1, wherein generating the search queries based on the second plurality of sentences comprises the machine learning model using at least on of part of speech tagging, named entity recognition, computing character combination, word length detection, and inverse document frequency scoring.

6. The system of claim 1, the operations further comprising providing a user with a comparison of the search queries and the plurality of sentences.

7. The system of claim 1, wherein the machine learning model is trained with training data comprising meta-data retrieved form license and credit information associated with the plurality of software documents.

8. A method for validating a search engine by automatically generating search queries from a plurality of software documents, the method comprising:
receiving the plurality of software documents;
parsing the plurality of software documents to extract a plurality of sentences;
mapping each of the plurality of sentences to a plurality of sections;
filtering the plurality of sentences;
consolidating the plurality of sections and the plurality of filtered sentences into a summary;
partitioning the summary into a first plurality of sentences;
replacing one or more of the first plurality of sentences with one or more paraphrase sentences generated by a machine learning model to generate a second plurality of sentences;
generating the search queries based on the second plurality of sentences; and
using the search queries to test whether the search engine finds the plurality of software documents.

9. The method of claim 8, wherein parsing the plurality of software documents to extract the plurality of sentences comprises converting a plurality of programming code snippets to a plurality of text snippets.

10. The method of claim 8, wherein filtering the plurality of sentences comprises removing stop words, duplicate sentences, and natural language sentences that are not associated with software components.

11. The method of claim 8, wherein the machine learning model is trained with training data comprising a plurality of software dictionaries, hierarchies, synonyms, sentence variations, and summary representations.

12. The method of claim 8, wherein generating the search queries based on the second plurality of sentences comprises the machine learning model using at least on of part of speech tagging, named entity recognition, computing character combination, word length detection, and inverse document frequency scoring.

13. The method of claim 8, further comprising providing a user with a comparison of the search queries and the plurality of sentences.

14. The method of claim 8, wherein the machine learning model is trained with training data comprising meta-data retrieved form license and credit information associated with the plurality of software documents.

15. One or more non-transitory computer-readable media for automatically generating search queries from software documents, the computer-readable media storing instructions thereon, wherein the instructions when executed by one or more processors cause the one or more processors to:
receive a plurality of software documents;
parse the plurality of software documents to extract a plurality of sentences;
map each of the plurality of sentences to a plurality of sections;
filter the plurality of sentences;
consolidate the plurality of sections and the plurality of filtered sentences into a summary;
partition the summary into a first plurality of sentences;
replace one or more of the first plurality of sentences with one or more paraphrase sentences generated by a machine learning model to generate a second plurality of sentences;
generate a plurality of search queries based on the second plurality of sentences; and
validate a search engine by using the search queries to test whether the search engine finds the plurality of software documents.

16. The one or more non-transitory computer-readable media of claim 15, wherein parsing the plurality of software documents to extract the plurality of sentences comprises converting a plurality of programming code snippets to a plurality of text snippets.

17. The one or more non-transitory computer-readable media of claim 15, wherein filtering the plurality of sentences comprises removing stop words, duplicate sentences, and natural language sentences that are not associated with software components.

18. The one or more non-transitory computer-readable media of claim 15, wherein the machine learning model is trained with training data comprising a plurality of software dictionaries, hierarchies, synonyms, sentence variations, and summary representations.

19. The one or more non-transitory computer-readable media of claim 15, wherein generating the plurality of search queries based on the second plurality of sentences comprises the machine learning model using at least on of part of speech tagging, named entity recognition, computing character combination, word length detection, and inverse document frequency scoring.

20. The one or more non-transitory computer-readable media of claim 15, wherein the instructions cause the one or more processors to provide a user with a comparison of between the plurality of search queries and the plurality of sentences.

* * * * *